Figure 1:
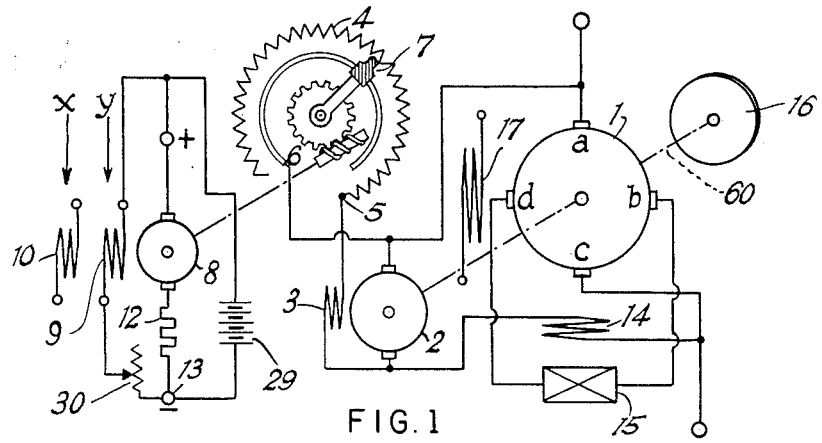

April 28, 1953   J. M. PESTARINI   2,637,013
SPEED CONTROL OF ELECTRIC MACHINES
Filed Nov. 27, 1946

INVENTOR
Joseph M. Pestarini
BY
Philip G. Hilbert
ATTORNEY

Patented Apr. 28, 1953

2,637,013

UNITED STATES PATENT OFFICE 2,637,013

SPEED CONTROL OF ELECTRIC MACHINES

Joseph Maximus Pestarini, Staten Island, N. Y.

Application November 27, 1946, Serial No. 712,630
In Great Britain September 25, 1946

4 Claims. (Cl. 322—27)

The invention relates to electric machines provided with special windings, referred to as speed regulator windings, allowing for a continuous modification of the torque of the machine so that it may rotate at an arbitrarily defined speed irrespective of the actual load. The current traversing the said regulator winding is referred to as regulator current and is supplied by a dynamo, referred to as regulator dynamo. The regulator dynamo is highly sensitive to its shaft speed and tends to cause large current variations with slight speed variations relative to a defined value, referred to as its critical speed.

In the said regulator dynamo which may be shunt excited or series excited, the building up speed is equal to the above mentioned critical speed. Such regulator dynamos have been described in many of the United States patents of the applicant, say in the United States Patent 2,055,240, issued September 22, 1936, and in the United States Patent 1,962,030, issued June 5, 1934.

In the description that follows the regulator dynamo is shown as a shunt excited dynamo for the sake of simplicity but it is understood that the regulator current may be supplied by a series excited dynamo.

In actual practice, the critical speed is set at a given value so that the normal operation of the machine occurs at that particular value of the speed.

The main object of the invention is the continuous and automatic modification of the value of the critical speed over a predetermined range of speed. The thus obtained continuous variation of the operational speed of the main machine causes a substantial modification of the characteristic of the armature currents of the machine provided with the regulator winding.

A further object of the invention is to provide means for automatically controlling the variation of the critical speed of the machine in order to obtain a desired useful characteristic of the said armature current.

The invention includes means for automatically modifying the length of a segment of an electric resistor, hereinafter referred as as the adjustable resistor which is inserted in the excitation circuit of the regulator dynamo.

The modification of the length of the adjustable resistor is obtained, according to the invention, by means of an electric device rotatable around an axis, developing a torque and assuming an orientation which is a desired function of the said armature currents of the machine. Preferably, a small dynamo, hereinafter referred to as a governor dynamo, is used for that purpose. The orientation, the torque and the speed of the governor dynamo may be made an arbitrarily defined function of the armature currents of the machine. According to the invention, this may be obtained either by providing the governor dynamo with a plurality of field windings with each winding traverse by the armature currents of the machine or by supplying to the armature of the said governor dynamo a voltage which is a definite function of the armature current of the machine.

The invention will be more clearly understood with the aid of the following description, reference being made to the accompanying figures.

Figure 2:
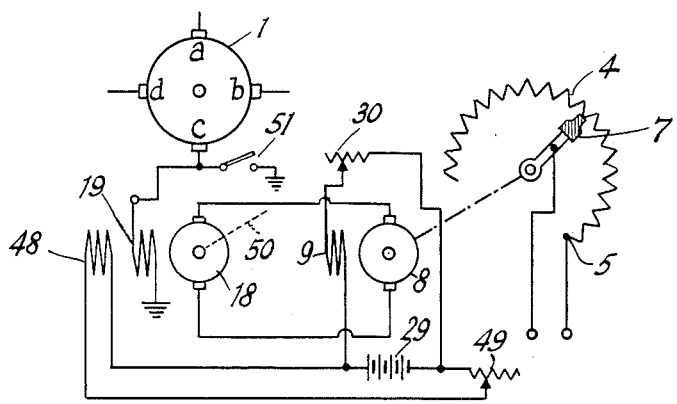
Figure 3:
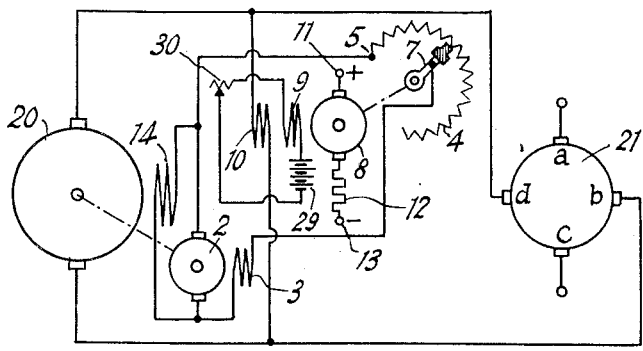

Figure 1 shows a general arrangement of the speed control, embodying the invention. Figure 2 shows an arrangement for supplying the armature of the governor dynamo with a controlled voltage. Figure 3 shows another arrangement embodying the invention with a main dynamo being supplied with current by a metadyne.

The metadyne, hereinafter mentioned, is an electric direct current machine having more than two brushes per cycle, the flux created by the current traversing the armature through a pair of brushes inducing an electromotive force between the brushes of another pair of the same cycle. The number of cycles of an electric machine is defined as the number of repetitions of the disposal of all electric and mechanical parts of the machine as seen by an observer accomplishing a complete circumference of the air gap.

The metadyne has been described in many United States Patents of the applicant, see for instance, Patents Nos. 2,055,240; 1,987,417; 2,038,380; 2,049,389; and 2,079,465. A more complete description has been given in Revue Generale de l'Electricite, on March 8, and 15, August 16 and 23, November 22 and 29 and December 6, 1930, Paris.

Figure 1 shows a Cross transformer metadyne 1 having its primary brushes $a$ and $c$ connected to an overhead line supplying a constant direct current voltage and its secondary brushes $b$ and $d$ connected to a consumer 15. The consumer may, for example, consist of traction motors. On the shaft, 60, of the Cross transformer metadyne is mounted a shunt excited regulator dynamo 2, the shunt field of winding 3 of which is connected in series with an adjustable resistor 4. The field current traversing the field winding 3 enters the adjustable resistor at the point 5, leaves it at the contact of the movable arm 7 through the ring 6 which is connected to the armature of the regulator dynamo 2. The regulator dynamo 2 is shown connected to the overhead constant voltage line. The current supplied by the regulator dynamo traverses a regulator winding 14 of the Cross transformer metadyne.

The resistor arm 7 is rotated around an axis by a governor motor 8 through a worm gear operated by the armature of motor 8. The armature of the motor 8 is traversed by a current supplied at the terminals 11 and 13 by a constant voltage direct current source 29.

In order to keep the armature current traversing the governor motor at a practically constant value, a ballast resistor 12 is provided in series with the armature. The field winding of the governor motor is shown comprising two members 9 and 10.

The secondary current supplied by the Cross transformer metadyne to the consumer 15 is controlled by a secondary variator winding 17 and accordingly the regulator current supplied by the regulator dynamo 2 adjusts itself so as to keep the speed of the Cross transformer metadyne practically at the critical value corresponding to the total resistance of the circuit of the shunt field winding of said regulator dynamo. If the resultant value of the ampere turns of the two field windings 9 and 10 of the governor motor is nil, the arm 7 is fixed and the speed of the Cross transformer metadyne will be maintained practically constant. If the value of the resultant ampere turns of the two field windings 9 and 10 is other than zero the governor motor 8 will rotate and the arm 7 will slide along the adjustable resistor 4. Thus the critical speed of the regulator dynamo will be continuously modified and therefore the operating speed of the Cross transformer metadyne will vary continuously over a predetermined range.

As a result the forces due to the inertia of the rotating members will then supply or absorb power. The consumer 15 will in the first case receive more power than that supplied by the overhead line. In the second case, the consumer will receive less power than that supplied by the overhead line. The amount of kinetic energy transformed by the Cross transformer metadyne into electric energy depends on the speed with which the arm 7 slides along the adjustable resistor 4 and therefore on the speed of the governor motor 8.

The current traversing the winding 10 of the governor dynamo 8, indicated in Fig. 1, by an arrow and the letter $x$, may be proportional to the current supplied by the overhead line. Accordingly, the winding 10 is adapted to be suitably connected in shunt relation to the primary circuit of metadyne 1. Let the current traversing the winding 9 and indicated by the letter $y$, be reduced to zero by means of rheostat 30. Then the governor motor 8 will continuously rotate in one sense or the other until the current traversing the winding 10 is also reduced to zero. In this case, the Cross transformer metadyne operates simply by transforming energy from the kinetic to electric energy supplied to the consumer 15 or the reverse.

Let the current $y$ traversing the winding 9 be set at a constant value by means of the rheostat 30. It is then apparent that the operation of the metadyne will result in a constant current being absorbed or supplied by the overhead line irrespective of the power absorbed or supplied by the consumer 15. During this operation, the overhead line will respectively absorb or supply a constant power, say $P_a$, while the Cross transformer metadyne will supply to the consumer 15 a variable power, say $P_b$, transforming not only the power supplied by the overhead line but also the power $P_b - P_a$ from the conversion of kinetic energy into electric energy supplied to the consumer.

Similarly the current supplied or absorbed by the consumer 15 may be caused to be kept constant by causing the current traversing the winding 10 to be proportionate to the current supplied to the consumer and by setting the current traversing the winding at an arbitrarily defined value. This may be conveniently accomplished by suitably connecting winding 10 in shunt relation to the secondary circuit of the metadyne 1.

In order to increase the kinetic energy stored by the rotating masses, a flywheel 16 may be provided on the shaft of the Cross transformer metadyne.

The regulator dynamo on Figure 1 is shown shunt excited; but it is understood that the dynamo 2 may be series excited.

Any other kind of regulator dynamo may be used as described in many patents of the same applicant.

Figure 2 shows the connections of a governor motor 8 having its armature supplied by a current derived from an auxiliary dynamo 18 driven at constant speed by shaft 50. The arrangement shown in Figure 2 is similar to that of Figure 1, it being understood that the resistor 4 is connected in the field excitation circuit of a regulator dynamo 2, as shown in Fig. 1.

The governor motor 8 is excited by the winding 9, traversed by a current supplied by the battery 29 and controlled by the rheostat 30. The auxiliary dynamo 18 is shown provided with two field windings 19 and 48. Winding 19 is adapted to be traversed by a current which may be proportional to the line current supplied to the primary brushes of metadyne 1. Accordingly, winding 19 may be series connected to brush $c$ of the metadyne. A switch 51 may short circuit the winding 19.

If switch 51 is open, the overhead line current coming from brush $c$ of the transformer metadyne 1 traverses the winding 19 and goes to the ground. Let the current traversing the winding 9 be set at a constant value and the current supplied by the battery 29 controlled by the rheostat 49, and traversing the winding 48 be also set at zero. The voltage induced by the auxiliary dynamo 18 will be proportional to the line current and therefore the metadyne 1 will accelerate or decelerate until the line current becomes zero. In other words, the system will operate transforming kinetic energy into electric energy for supplying current to the consumer while the line current will be kept at an intensity having a value approaching zero.

With the switch 51 open, let the current traversing winding 9 be given a constant value and the current traversing winding 48 be given a constant value. The metadyne 1 will accelerate or decelerate at such a ratio as to keep the line current practically constant.

With the switch 51 closed, let the current traversing winding 9 be given a constant value and the current traversing winding 48 be given a constant value. The acceleration or the deceleration of the rotating masses will then be kept constant, It may vary inversely proportional to the square of the rotational speed if adequate subdivision of the resistance of the portions of the adjustable resistor 4 between two consecutive contact elements along which the arm 7 slides, is provided.

Figure 3 shows a dynamo 20 with field winding 14, traversed by the regulator current, supplied by a shunt excited regulator dynamo 2 which is coupled to dynamo 20. The dynamo 20 is supplied with current by a metadyne 21. The system further includes a governor motor 8 operating the adjustable resistor 4 and modifying the critical speed of the regulator dynamo 2 as previously described. The field winding of the governor motor 8 is shown comprising two members, a member 10 shunt connected across the brushes of the dynamo 20 and a member 9 adapted to be independently supplied with current by battery 29 through the controlling rheostat 30.

Let the secondary current of the metadyne 21 be constant. Set the current traversing the field winding 9 of the governor dynamo, 8, at an arbitrary value, the total power absorbed by the dynamo 20 will be kept constant. If the current traversing the winding 9 is reversed, the power supplied by the dynamo 20 while braking will be kept constant. Such a system is especially useful for steel mills.

It will thus be seen that there is provided automatic means for continuously varying the speed of a direct current machine in one direction of rotation or in the reverse so that a conversion of mechanical into electrical energy is obtained resulting in a desired characteristic of the armature currents and voltages of said machine. Further means are provided for modifying the said characteristics in which the several objects of the invention are achieved.

As various possible embodiments might be made of the above described invention, and as various changes might be made in the embodiments set forth, it is to be understood that all matter herein set forth or shown in the accompanying drawings, is to be interpreted as illustrative and not in a limited sense.

I claim:

1. An electric system comprising a direct current variable speed machine including a control stator winding, a self-excited speed regulator dynamo operable at a critical speed to provide a regulator current, such critical speed being determined by the value of the resistance of its excitation circuit, said dynamo being coupled to said machine and in circuit with said stator winding, means for continuously varying the value of the resistance of said excitation circuit comprising a variable resistor in said circuit, rotatable electrical means for varying said resistor, and means for controlling the operation of said rotatable electrical means comprising two control windings, one of said windings being adapted to be energized by an arbitrary current, the other winding being adapted to be energized by a current proportional to the electrical characteristics of said direct current machine, whereby to obtain continuous conversion between kinetic and electric energy.

2. A system as in claim 1, wherein said rotatable electrical means comprises a motor operatively connected to said variable resistor and a generator connected to said motor, said generator including a field winding adapted to be traversed by a current proportional to the electrical characteristics of said direct current machine.

3. A system as in claim 1, wherein said direct current machine comprises a dynamoelectric machine of the metadyne type including a pair of primary brushes adapted to be energized from a constant voltage source and a pair of secondary brushes adapted to be connected to a motor.

4. A system as in claim 3, wherein said rotatable electric means comprises a motor operatively connected to said variable resistor and including a field winding adapted to be energized by an arbitrary current, a generator connected to said last mentioned motor and including a pair of field windings, one of said pair of windings being adapted to be energized by an arbitrary current, the other of said pair of windings being adapted to be energized by a current proportional to the electrical characteristics of said direct current machine.

JOSEPH MAXIMUS PESTARINI.

References Cited in the file of this patent

UNITED STATES PATENTS

| Number | Name | Date |
| --- | --- | --- |
| 1,987,417 | Pestarini | Jan. 8, 1935 |
| 2,282,874 | Moore et al. | May 12, 1942 |